US011337108B2

(12) United States Patent
John et al.

(10) Patent No.: US 11,337,108 B2
(45) Date of Patent: May 17, 2022

(54) UPLINK CONGESTION CONTROL BASED ON SIP MESSAGING

(71) Applicant: Verizon Patent and Licensing Inc., Washington, DC (US)

(72) Inventors: Toby Varughese John, Murphy, TX (US); Jonathan Daniel Bahta, Dallas, TX (US); Timothy R. Vogel, Trophy Club, TX (US); Yves Tegaboue, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 16/794,943

(22) Filed: Feb. 19, 2020

(65) Prior Publication Data
US 2021/0258824 A1 Aug. 19, 2021

(51) Int. Cl.
*H04W 28/02* (2009.01)
*H04W 76/10* (2018.01)
*H04W 80/10* (2009.01)

(52) U.S. Cl.
CPC ... *H04W 28/0289* (2013.01); *H04W 28/0284* (2013.01); *H04W 76/10* (2018.02); *H04W 80/10* (2013.01)

(58) Field of Classification Search
CPC ............ H04W 28/0289; H04W 76/10; H04W 28/0284; H04W 80/10; H04W 28/0268; H04L 63/1458; H04L 65/1006; H04L 63/1416; H04L 63/1425; H04L 2463/141; H04L 47/10; H04L 69/22; H04L 47/2441
See application file for complete search history.

(56) References Cited

U.S. PATENT DOCUMENTS

| 8,463,909 | B1 * | 6/2013 | Szabo | H04Q 3/0091 |
| | | | | 709/226 |
| 9,071,576 | B1 * | 6/2015 | Earl | H04L 63/1466 |
| 10,469,661 | B1 * | 11/2019 | Xuereb | H04M 3/2272 |
| 2006/0041505 | A1 * | 2/2006 | Enyart | H04L 51/00 |
| | | | | 705/40 |

(Continued)

FOREIGN PATENT DOCUMENTS

CN 106789849 A * 5/2017
WO WO-2014209493 A1 * 12/2014 ......... H04N 21/2402

OTHER PUBLICATIONS

Batteram et al., "SIP Message Prioritization and Its Applications", 2006, Bell Labs Technical Journal, pp. 21-36 (Year: 2006).*

*Primary Examiner* — Michael K Phillips

(57) ABSTRACT

Uplink congestion control based on session initiation protocol (SIP) messaging includes receiving SIP messages from user equipment devices (UEs) via established wireless uplink connections; and monitoring a rate of the SIP messages received from the UEs. Uplink congestion control further includes identifying whether the rate of received SIP messages exceeds a first threshold during a first period of time; and sending SIP response messages to the UEs to reduce congestion on the wireless uplink connections upon identifying that the rate of received SIP messages exceeded the first threshold over the first period of time, where the sent SIP response messages instruct the UEs to resend the SIP messages after predetermined time delays.

20 Claims, 7 Drawing Sheets

(56) References Cited

U.S. PATENT DOCUMENTS

| | | | |
|---|---|---|---|
| 2009/0122705 A1* | 5/2009 | DeVal | H04L 47/10 370/235 |
| 2009/0310484 A1* | 12/2009 | Sisalem | H04L 12/66 370/230 |
| 2010/0030914 A1* | 2/2010 | Sparks | H04L 47/266 709/235 |
| 2013/0279521 A1* | 10/2013 | Perez Martinez | H04L 41/5029 370/468 |
| 2014/0173731 A1* | 6/2014 | Mantripragada | H04L 12/6418 726/22 |
| 2017/0070543 A1* | 3/2017 | Balasubramanian | H04W 28/0268 |
| 2018/0183839 A1* | 6/2018 | Chiang | H04L 65/1046 |
| 2020/0007596 A1* | 1/2020 | Tsiatsikas | H04L 67/42 |

* cited by examiner

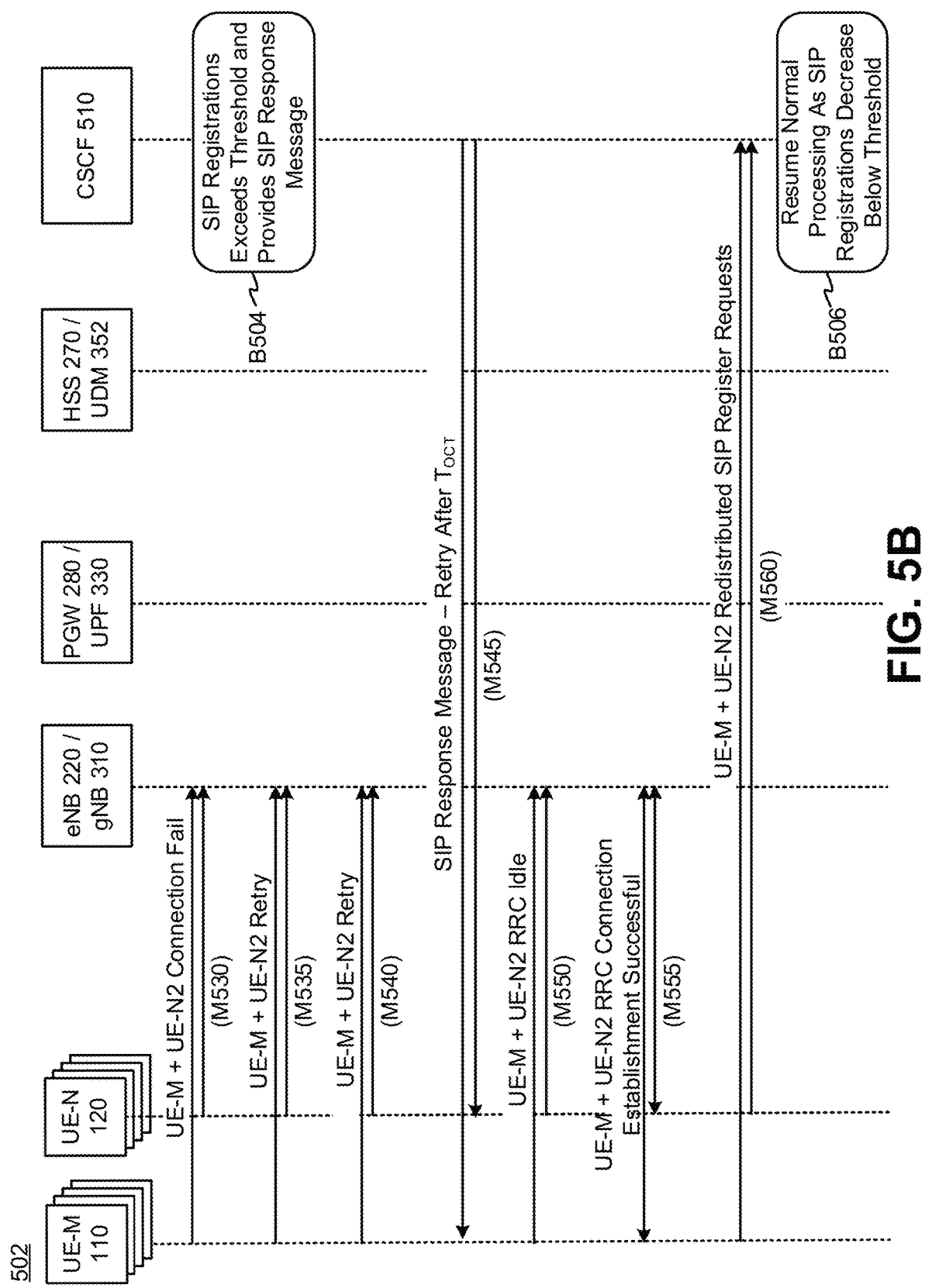

UPLINK CONGESTION CONTROL BASED ON SIP MESSAGING

BACKGROUND

Long Term Evolution (LTE) is an existing mobile telecommunications standard for wireless communications. Next Generation wireless networks, such as fifth generation (5G) networks, will provide increased capacity and speed. Both LTE and 5G networks will communicate with increasing numbers of Internet of things (IoT) and user equipment (UE) devices. Supporting growing device numbers combined with external factors such as power outages may present operational challenges for network operators.

BRIEF DESCRIPTION OF THE DRAWINGS

FIGS. 5A-5B are diagrams showing exemplary message flows within a networking system for uplink congestion control based on session initiation protocol (SIP) messaging.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Telecommunication advancements have led to increases in the numbers and utilization of User Equipment devices (UE), including mobile communication handsets (e.g., so called smart phones) and internet of things (IoT) devices. Growing device subscribers in the marketplace combined with external factors such as power outages can present risks to Radio Access Networks (RAN) as well as the IP Multimedia System (IMS) infrastructure. For example, during a power outage, a large number of IoT or Machine-to-Machine (M2M) devices such as smart power meters or automatic teller machines (ATMs) residing within a cell may undergo synchronous reboots, which can prevent smart phone users' access to services on the same cells. Service restoration for non-IMS smart devices requires establishing RAN and EPC/5G Core (5GC) connections and sending data. Service restoration for IMS supported devices require establishing RAN, EPC/5GC, and IMS connections. Thereafter, devices are required to perform IMS registration after attaching to the LTE network. The large quantity of RAN signaling and IMS Registration Requests from devices results in packet congestion on the RAN uplink and the Call-Session Control Function (CSCF) in the IMS.

Packet congestion on the RAN uplink and/or the IMS may be controlled based on redistribution of SIP messages, by leveraging parameters within SIP message headers. For example, in an embodiment, rates of SIP registration requests received by a call session control function (CSCF) may be monitored to determine whether the rate exceeds a threshold of registrations/requests over a period of time, and subsequently be used to trigger SIP response messages having provisional response codes, where the SIP response messages may include random times to retry the SIP registration requests. Redistribution of the SIP registration requests over the specified random times can alleviate congestion on the RAN uplink and the IMS.

Embodiments described herein are directed to wireless communications systems which perform uplink congestion control based on session initiation protocol (SIP) messaging.

Figure 1:
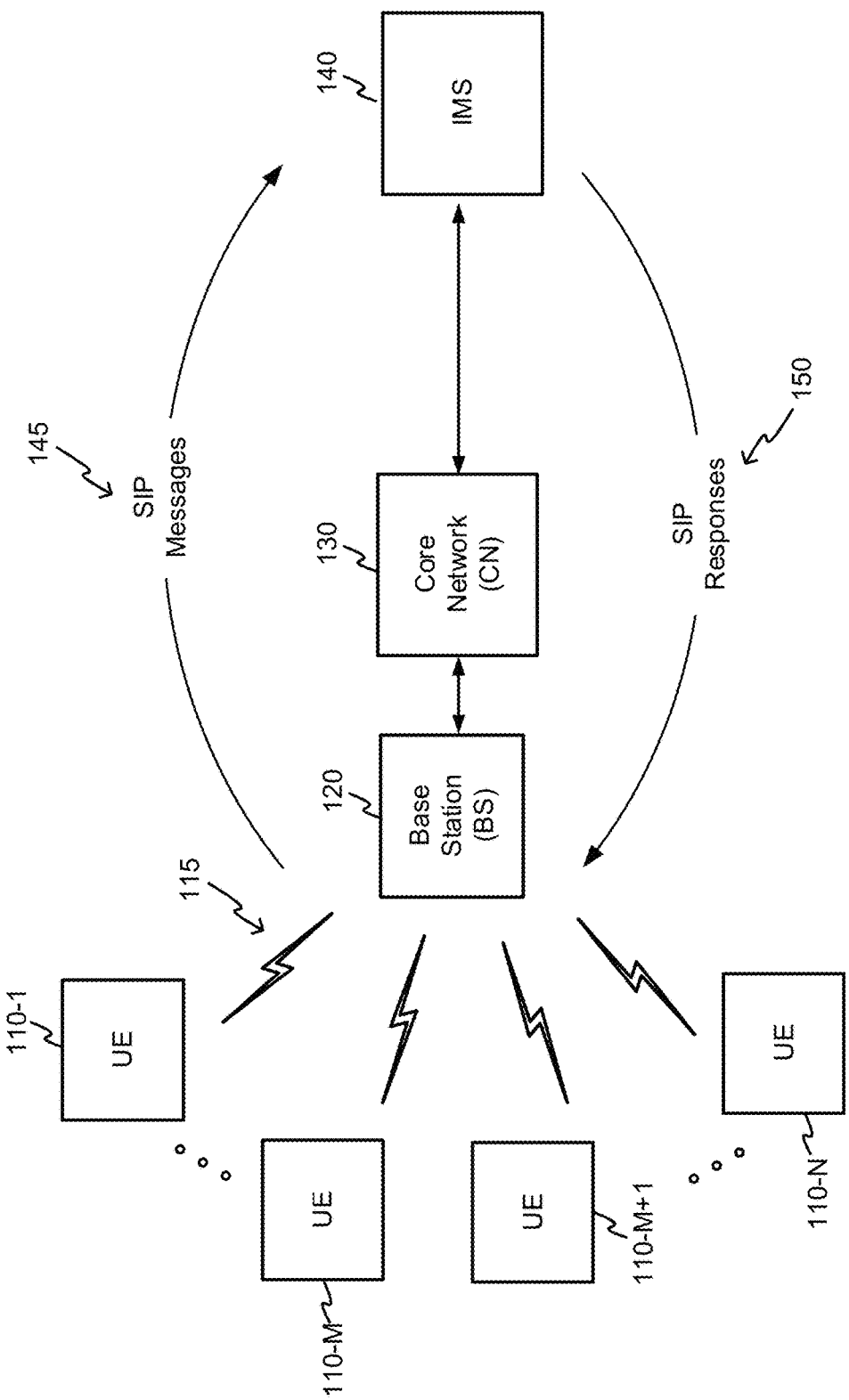
FIG. 1 is a diagram illustrating an exemplary wireless communication system consistent with an embodiment.

FIG. 1 is a diagram illustrating an exemplary wireless communication system 100 consistent with an embodiment. As shown in FIG. 1, environment 100 may include user equipment devices (UEs) 110-1 to 110-N (referred to herein plurally, but not necessarily collectively or in their entirety, as "UEs 110", and individually as "UE 110-x"), a base station (BS) 120, a core network (CN) 130, and an IP multimedia subsystem (IMS) 140. UEs 110 may wirelessly communicate with BS 120 via RAN 115 using any type of known cellular network, such as, for example, LTE, LTE Advanced, 5G, etc. UEs 110 may exchange data with CN 130 via BS 120 through one or more dedicated channels. CN 130 may further exchange data with IMS 140 via a backhaul network (not shown). Accordingly, through BS 120 and CN 130, UEs 110 may obtain access to IMS 140 for exchanging IP data using any application protocol, such as SIP.

In an embodiment, one subset of UEs 110 (e.g. UE 110-1 through UE 110-M) may operate as mobile communications devices (e.g., smart phones) and another subset of UEs 110 (UE 110-M+1 through UE 110-N) may operate as internet of things (IoT) devices. UEs 110 may be in various states of connection with BS 120 via RAN 115. For example, some UEs 110 may have radio connections in an active state (e.g., radio resource connection (RRC) active) where data may be exchanged, and other UEs 110 may have idle radio connections (e.g., RRC idle).

Various events may cause a subset of UEs 110 to jointly (e.g., substantially synchronously or contemporaneously) lose and attempt to reestablish their radio connections with base station 120. In conventional wireless systems, when the number of UEs 110 that attempt to reestablish their radio connections are large, congestion within the wireless communication system 100 may result, thus preventing proper recovery of the communication channels. Such situations may deplete RAN 115 resources, and when trying to reconnect to IMS 140, further give rise to a "(SIP) registration storm." Wireless communication system 100 shown in FIG. 1 employs a congestion control approach which may be performed by IMS 140 (for example, as discussed in more detail below, by a call session control function (CSCF) within IMS 140).

When an event, such as, for example, a power interruption, disrupts a large number of UEs 110 (e.g., over 2000 IoT devices), uplink connection resources in RAN 115 may become exhausted, and the disrupted UEs 110 may subsequently send a large number of SIP messages 145 (e.g., SIP registration requests) to IMS 140. IMS 140 may detect an increased rate of received SIP messages, and upon determining that the rate exceeds a threshold, IMS 140 may reply with SIP responses 150 that cause UEs 110 to delay reestablishing the connection to RAN 115 (e.g., by facilitating the UEs 110 transition from the RRC connected state to the RRC idle state). Such delays to redistribute SIP messages 145 (e.g., SIP registration messages) over a period of time may allow the SIP re-registration to be better managed by wireless communication system 100. Accordingly, the congestion control approach relieves congestion at both the RAN 115 and the IMS 140. By applying congestion control, the system described herein may better manage radio resources by reshaping the time distribution of requests by UEs 110 for those radio resources over time. For example, in the absence of congestion control, the synchronous rebooting of UEs 110 (e.g., IoT devices) requesting radio resources after a disruption (e.g., power, radio connectivity, etc.) may be impulse-like in nature. That is, the distribution would be highly concentrated over a brief period of time, which causes congestion in wireless communication system 100. This can prevent additional UEs 110 from obtaining access to RAN 115. By using congestion control techniques, the distribution of requests by UEs 110 may be spread out over time (e.g., increasing linearly over time), and thus avoid exhaustion of radio resources in RAN 115. As used herein, "radio resources" may include radio resource elements which allocate time and frequency resources within a frame or sub-frame.

Further referring to FIG. 1, UEs 110 may include any device with long-range (e.g., cellular or mobile wireless network) wireless communication functionality. For example, UEs 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer, or a digital media player (e.g., Apple TV®, Google Chromecast®, Amazon Fire TV®, etc.); a smart television; a portable gaming system; a global positioning system (GPS) device; a home appliance device; a home monitoring device; and/or any other type of computer device with wireless communication capabilities and a user interface. UE 110 may also include any type of customer premises equipment (CPE) such as a set top box, a wireless hotspot (e.g. an LTE or 5G wireless hotspot), a femto-cell, etc. UE 110 may include capabilities for voice communication, mobile broadband services (e.g., video streaming, real-time gaming, premium Internet access etc.), best effort data traffic, and/or other types of applications.

In an embodiment, UEs 110 may be associated with classes of users that can be exempt from SIP responses provided to control congestion. Accordingly, the predetermined time delays may be based on a class of user. For example, if UE 110-1 is associated with an emergency and/or public safety responder (e.g., fire, police, paramedic, etc.—hereinafter referred to as a "first responder class"), UE 110-1 may ignore SIP responses received from IMS 120 instructing UE 110-1 to retry SIP registration after a specified random period of time. In some embodiments, even first responder classes of users may be subject to with congestion control to ensure appropriate access to radio resources in a variety of situations. However, first responder classes of users may have different algorithms and/or parameters (e.g. time delays, thresholds, etc.) applied. For example, devices associated with first responder class users may receive a response to a registration request that indicates a delay for re-registration that is between a certain set of threshold values, which, for example, may be significantly less than UEs that are not included in the first responder class. Thereby emergency personnel, for example, may still reattach quickly to the IMS 120 by staggering the SIP registration requests, but still reducing congestion at the RAN. In another embodiment, different classes of users may be established that have different delay ranges for registration, thus providing different time periods for congestion control which are appropriate for the various classes of users. Such classes may be based on, for example, level of service, whether a UE is roaming or in a home network, etc. In another embodiment, different classes of congestion control may be based on various state parameters of UE 110 (e.g., position, velocity, altitude), RF power level, battery level, proximity within the coverage of base station 102, etc.

In some implementations, UEs 110 may communicate using machine-to-machine (M2M) communication, such as machine-type communication (MTC), a type of M2M communication standardized by the $3^{rd}$ Generation Partnership Project (3GPP), and/or another type of M2M communication. UEs 110 may be embodied as Internet of things (IoT) devices, which may include health monitoring devices, asset tracking devices (e.g., a system monitoring the geographic location of a fleet of vehicles, etc.), sensors (e.g., utility sensors, traffic monitors, etc.)

BS 120 and CN 130 provide access to IMS 140 for providing multimedia IP services to UEs 110. Such services may include mobile voice service (e.g., various forms of VoIP), short message service (SMS), multimedia message service (MMS), multimedia broadcast multicast service (MBMS), Internet access, cloud computing, and/or other types of data services. While not shown, BS 120 and CN 130 may further provide additional access to a wide area network (WAN) not shown for other IP and/or non-IP data delivery (NIDD) services.

In some implementations, BS 120 and CN 130 may include Long Term Evolution (LTE) and/or LTE Advance (LTE-A) capability, where BS 120 may serve as an eNodeB, and CN 130 may serve as an evolved packet core (EPC) network. Alternatively, in other implementations, BS 120 and CN 130 may include 5G access capability, where BS 120 may serve as an gNodeB, and CN 130 may serve as a 5G packet core (5G PC) network. Such implementations may include functionality such as 5G new radio (NR) base stations; carrier aggregation; advanced or massive multiple-input and multiple-output (MIMO) configurations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology.

IMS 140 may include one or more devices, such as computer devices, databases, and/or server devices, that facilitate IP data delivery services. Such services may include supporting IoT applications such as alarms, sensors, medical devices, metering devices, smart home devices, wearable devices, retail devices, etc. Other services may include supporting other communications applications (e.g., short message service (SMS), etc.), automotive applications, aviation applications, etc. IMS 140 may communicate with UEs 110 over BS 120 and CN 130 using IP and/or non-IP bearer channels.

Although FIG. 1 shows exemplary components of wireless communication system 100, in other implementations, wireless communication system 100 may include fewer components, different components, differently arranged components, or additional components than depicted in FIG. 1. Additionally or alternatively, one or more components of wireless communication system 100 may perform functions described as being performed by one or more other components of wireless communication system 100.

Figure 2:
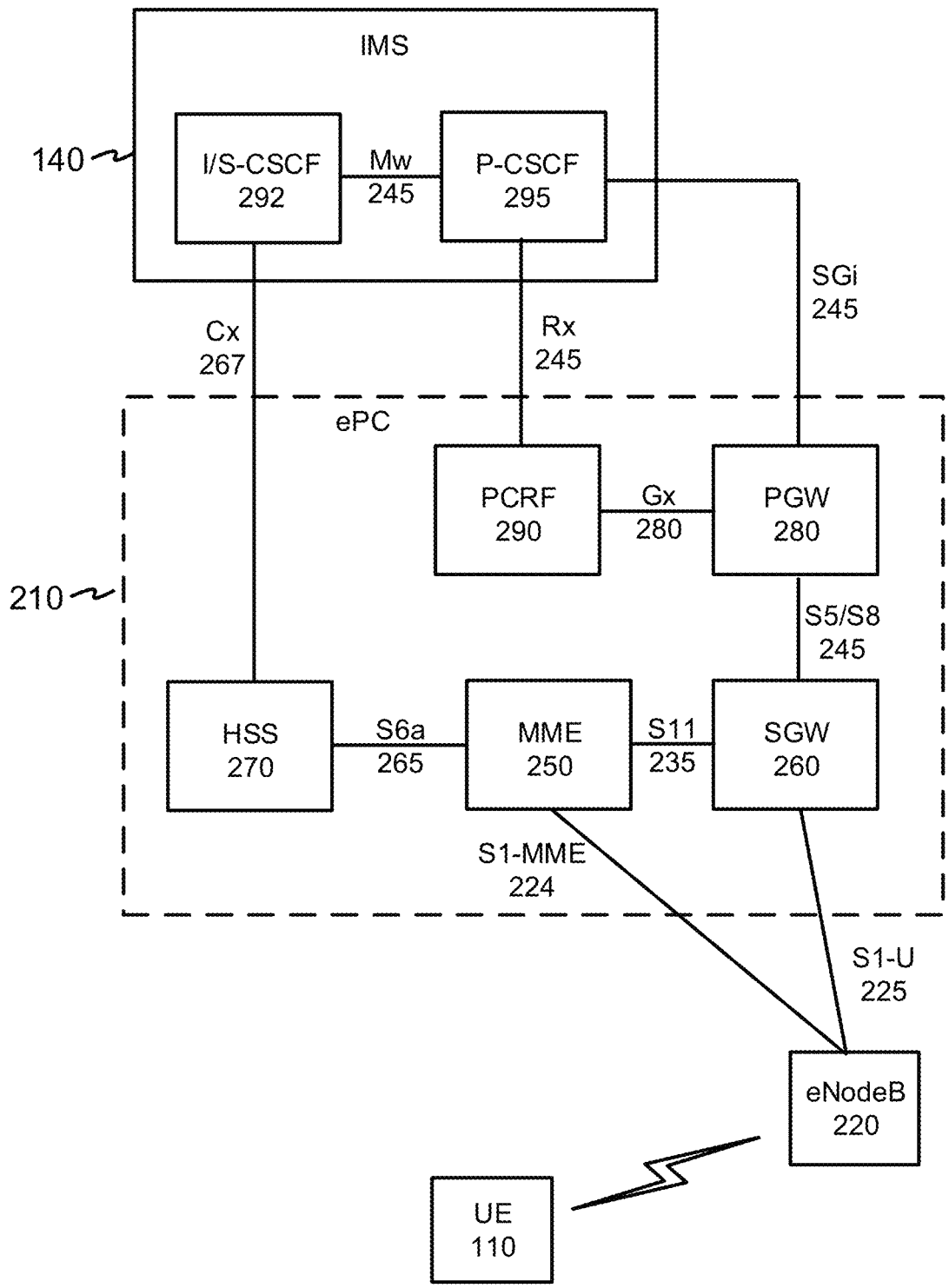
FIG. 2 is a block diagram of an exemplary wireless communication system having a radio access network based on an LTE standard.

FIG. 2 is a block diagram of an exemplary wireless communication system 200 based on the LTE standard. Wireless communication system 200 may include an LTE network with an evolved Packet Core (ePC) 210 and eNodeB 220 (corresponding, for example, to CN 130 and BS 120, respectively). UE 110 and eNodeB 220 may exchange data over a radio access technology (RAT) based on LTE air channel interface protocols. In the embodiment shown in FIG. 2, EPC 210 may operate in conjunction with an evolved Universal Mobile Telecommunications System (UMTS) Terrestrial Network (eUTRAN) that includes at least one eNodeB 220. Wireless communication system 200 may further include an IP network and/or a non-IP network. Such networks may be embodied separately or included in a backhaul network and/or in a wide area network (not shown). EPC 210 may also be connected to subsystems in IMS 140.

EPC 210 may include one or more devices that are physical and/or logical entities interconnected via standardized interfaces. EPC 210 provides wireless packet-switched services and wireless packet connectivity to UEs 110 to provide, for example, data, voice, and/or multimedia services. EPC 210 may further include a mobility management entity (MME) 250, a serving gateway (SGW) 260, a home subscriber server (HSS) 270, a packet data network gateway (PGW) 280, a Policy and Charging Rules Function (PCRF) 290, and a SCEF 295. It is noted that FIG. 2 depicts a representative networking system 200 with exemplary components and configuration shown for purposes of explanation. Other embodiments may include additional or different network entities in alternative configurations than which are exemplified in FIG. 2. IMS 140 may include various call session control functions (CSCF), which may include interrogating/serving CSCF 292 (I/S CSCF), and proxy CSCF 295 (P-CSCF). I/S-CSCF 292 and P-CSCF 295 may exchange information using an Mw interface 245 using session initiation protocol (SIP).

Further referring to FIG. 2, eNodeB 220 may include one or more devices and other components having functionality that allows UE 110 to wirelessly connect via the RAT of eNodeB 220. eNodeB 220 may interface with ePC 210 via a S1 interface, which may be split into a control plane S1-MME interface 224 and a data plane S1-U interface 225. EnodeB 220 may interface with MME 250 via S1-MME interface 224, and interface with SGW 260 via S1-U interface 225. S1-U interface 226 may be implemented, for example, using GTP. S1-MME interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may implement tracking and paging procedures for UE 110, may activate and deactivate bearers for UE 110, and may authenticate a user of UE 110 to provide normal coverage service for operating in normal UE device mode. MME 250 may also select a particular SGW 260 for a particular UE 110. MME 250 may interface with other MMEs (not shown) in ePC 210 and may send and receive information associated with UEs 110, which may allow one MME 250 to take over control plane processing of UEs serviced by another MME 250, if the other MME becomes unavailable.

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 245. S5/S8 interface 245 may be implemented, for example, using GTP.

PGW 280 may function as a gateway to WAN 140 through a SGi interface 255. WAN 140 may provide various services (e.g., over the top voice services) to UE 110. A particular UE 110, while connected to a single SGW 260, may be connected to multiple PGWs 280, one for each packet network with which UE 110 communicates. PGW 280 may exchange information with P-CSCF 295 using an SGi interface 245 based on TCP/IP.

Alternatively, UE 110 may exchange data with WAN 140 though a WiFi wireless access point (WAP) (not shown). The WiFi WAP may be part of a local area network, and access WAN 140 through a wired connection via a router. Alternatively, the WiFi WAP may be part of a mesh network (e.g., 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260).

HSS 270 may store information associated with UE 110 and/or information associated with users of UE 110. For example, HSS 270 may store user profiles that include registration, authentication, and access authorization information. MME 250 may communicate with HSS 270 through an S6a interface 265. S6a interface 265 may be implemented, for example, using a Diameter protocol. HSS 270 may communicate with I/S CSCF 292 via a Cx interface 267. Cx interface 257 may be implement using a Diameter protocol.

PCRF 290 provides policy control decision and flow based charging control functionalities. PCRF 290 may provide network control regarding service data flow detection, gating, QoS and flow based charging, etc. PCRF 290 may determine how a certain service data flow shall be treated, and may ensure that user plane traffic mapping and treatment are in accordance with a user's subscription profile based, for example, on a specified quality of service (QoS) class identifier (QCI). PCRF 290 may communicate with PGW 280 using a Gx interface 280. Gx interface 280 may be implemented, for example, using a Diameter protocol. PCRF 290 may also interface to P-CSCF 295 using an Rx interface 245. The Rx interface may be used to exchange charging information via a Diameter protocol.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
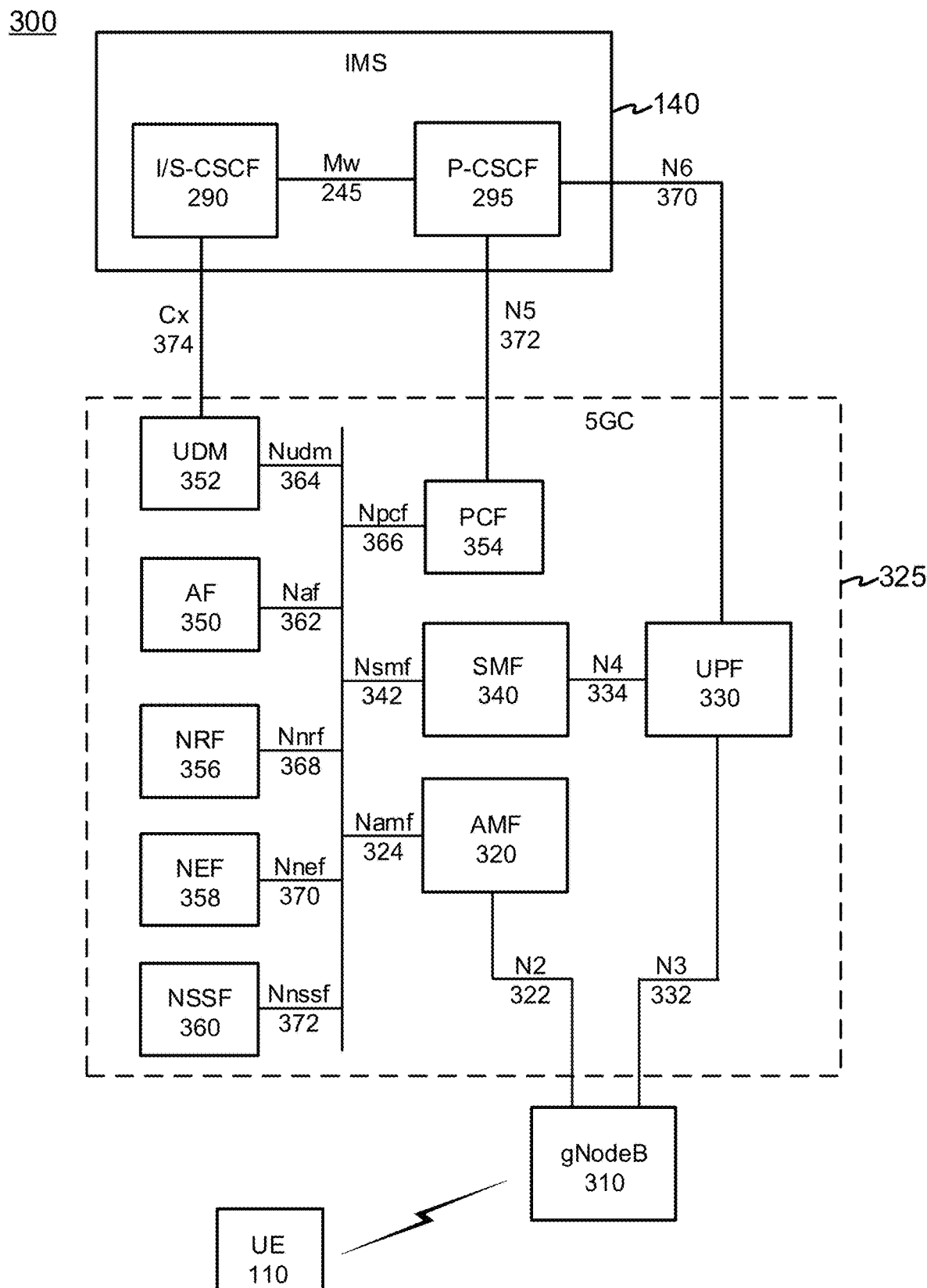
FIG. 3 is a block diagram of an exemplary wireless communication system having a radio access network based on a 5G standard.

FIG. 3 is a block diagram of an exemplary wireless communication system 300 having a radio access network based on a 5G standard. Wireless communication system 300 may include an 5G network with a 5G Core (5GC) 325, gNodeB 310 (corresponding, for example, to CN 130 and BS 120, respectively), UE 110, and IMS 140. UE 110 and gNodeB 310 may exchange data over a radio access technology (RAT) based on 5G air channel interface protocols. Wireless communication system 300 may further include an Internet Protocol (IP) network and/or a non-IP network, which may be embodied separately or included in a backhaul network and/or in a wide area network (not shown). 5GC 325 may also be connected to subsystems in IMS 140. IMS 140 may include various CSCFs, I/S-CSCF 292 and/or P-CSCF 295, which may exchange information via Mw interface 245 using SIP.

5GC 325 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 310, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, NEFs 358, and NSSFs 360.

gNodeB 310 may include one or more device, components, and/or functionality that enable UE 110 to wirelessly connect to 5GC 325 using 5G NR Radio Access Technology (RAT). For example, gNodeB 310 may include one or more cells, with each cell site equipment including a wireless transceiver with an antenna array configured for millimeter-wave wireless communication. gNodeB 310 may implement one or more RAN slices to partition 5GC 325. gNodeB 310 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE 110 and an SMS function (not shown in FIG. 3), session management messages transport between UE 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via a Namf interface 324.

UPF 330 may maintain an anchor point for intra/inter-RAT mobility, maintain an external Packet Data Unit (PDU) point of interconnect to a data network (e.g., WAN 140), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to WAN 140 using an N6 interface 336. UPF 330 may communicate with P-CSCF 295 using an N6 interface 370.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for UE 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via a Nudm interface 364. UDM 352 may communicate with I/S-CSCF 290 through a Cx interface 374. Cx interface 374 may exchange data pertaining to, for example, user registration, authentication, location, and profile information.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards. PCF 354 may communicate with P-CSCF 295 via N5 interface 372. N5 interface 372 may exchange data pertaining to for example, QoS information, authorization, and retention priority information.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities, events, and/or status to other NFs, including third party NFs, AFs, edge computing NFs, and/or other types of NFs. For example, NEF 358 may provide capabilities and events/status of UE 110 to AS 150. Furthermore, NEF 358 may secure provisioning of information from external applications to access network 120, translate information between access network 120 and devices/networks external to access network 120, support a Packet Flow Description (PFD) function, and/or perform other types of network exposure functions. NEF 358 may be accessible via Nnef interface 370.

NSSF 360 may select a set of network slice instances to serve a particular UE 110, determine network slice selection assistance information (NSSAI), determine a particular AMF 320 to serve a particular UE 110, and/or perform other types of processes associated with network slice selection or management. In some implementations, NSSF 360 may implement some or all of the functionality of managing RAN slices in gNodeB 310. NSSF 360 may be accessible via Nnssf interface 372.

Although FIG. 3 shows exemplary components of 5GC 325, in other implementations, 5GC 325 may include fewer components, different components, differently arranged components, or additional components than depicted in FIG. 3. Additionally or alternatively, one or more components of 5GC 325 may perform functions described as being performed by one or more other components of 5GC 325. For example, 5GC 325 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, 5GC 325 may include a reference point architecture that includes point-to-point interfaces between particular function nodes.

Figure 4:
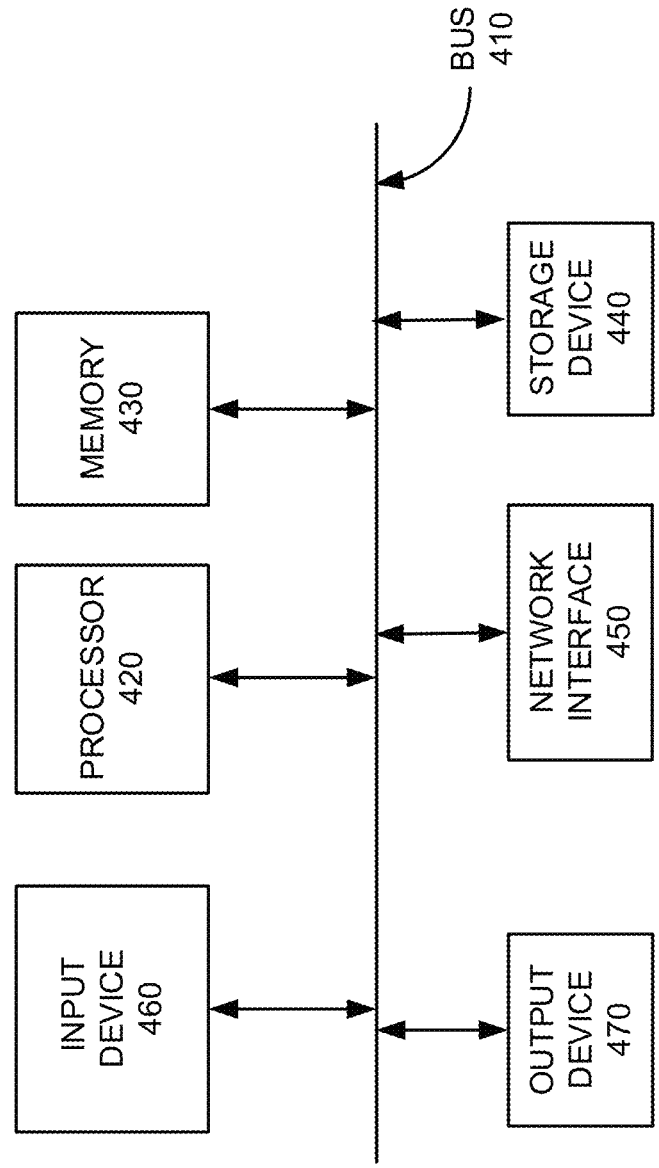
FIG. 4 is a block diagram showing exemplary components of a network device according to an embodiment.

FIG. 4 is a block diagram showing exemplary components of a network device 400 according to an embodiment. Network device 400 may include one or more network elements illustrated in FIG. 2 and/or FIG. 3, such as, for example, I/S-CSCF 290, P-CSCF 295, MME 250, AMF 320, HSS 270 UDM 352, SCEF 295, and/or NEF 358, etc. In some embodiments, there may be a plurality of network devices 400 providing functionality of one or more network elements. Alternatively, once network device 400 may perform the functionality of any plurality of network elements. Network device 400 may include a bus 410, a processor 420, a memory 430, storage device 440, a network interface 450, input device 460, and an output device 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities are communicatively coupled to WAN 140.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 110.

Network interface 450 may include a transceiver that enables network device 150 to communicate with other devices and/or systems in network environment 100. Network interface 450 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 450 may interface with wide area network 140 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, a radio frequency identification device (RFID) interface, a near field communications (NFC) wireless interface, and/or any other type of interface that converts data from one form to another form.

As described below, network device 400 may perform certain operations relating to performing uplink congestion control based on SIP) messaging. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the signal flows in FIGS. 5A-5B and the flow chart shown in FIG. 6.

Although FIG. 4 shows exemplary components of network device 400, in other implementations, network device 400 may include fewer components, different components, additional components, or differently arranged components than depicted in FIG. 4.

Figure 5A:
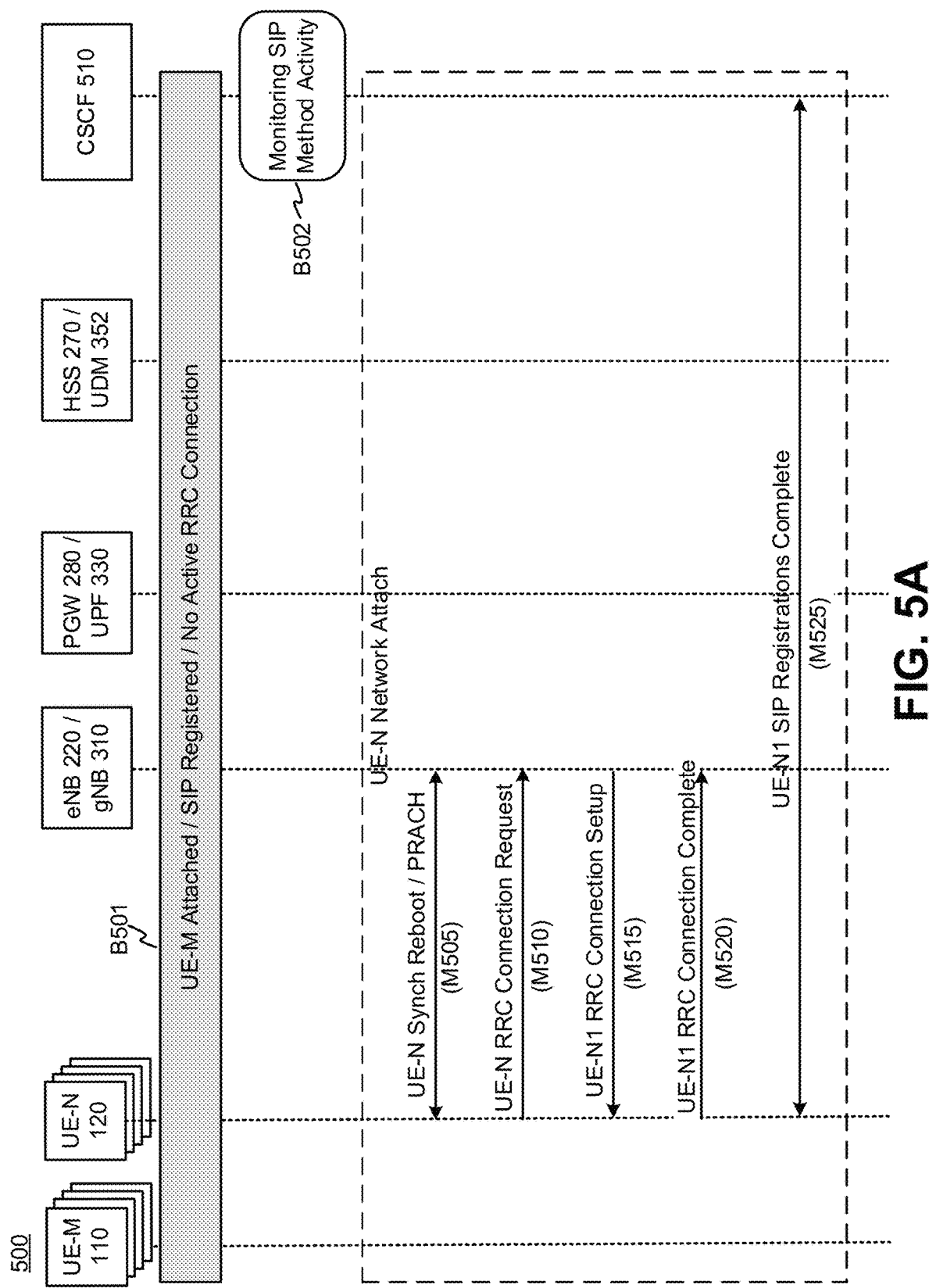

FIGS. 5A-5B are diagrams showing exemplary message flows within a wireless communication system 200 and/or 300 for performing uplink congestion control based on SIP messaging. The message flow diagrams show network components which may correspond to both LTE and 5G network standards. The LTE components are shown with the label "2XX" and the 5G components are shown with the label "3XX." For example, as shown in FIGS. 5A-5B, the base station elements are shown as "eNode 220/gNode 310," the mobility managers are shown as "MME 250/AMF 320," etc.

In FIG. 5A, flow diagram 500 initially shows "M" (M being an integer greater than zero) user equipment devices (hereinafter UEs-M 110) that may have previously attached to CN 130 and registered to IMS 140, but currently have no active RRC connection with eNodeB 220 or gNodeB 310 (eNB 220/gNB 310) (Block 501). UEs-M 110 may be in an RRC Idle state, may be powering on, and/or may be performing a handover to base station 120 from another base station. During this time UEs-M 110 cannot establish services unless UEs-M 110 reestablish active RRC connections with eNB 220/gNB 310.

CSCF 510 (CSCF 510 may be I/S-CSCF 290 and/or P-CSCF 295) may be independently monitoring SIP method activity (B502). Monitoring SIP method activity may include tracking received SIP messages from UEs 110 (including UEs-M 110). Such messages may include SIP method register (e.g., SIP registration requests).

FIG. 5A further shows "N" (N being an integer greater than zero) user equipment devices (hereinafter UEs-N 110) that are jointly (substantially simultaneously or synchronously) being rebooted and attempting to attach to CN 130. The network attach procedure may include the following steps. Initially, UEs-N 110 are jointly rebooted and/or undergo a synchronization procedure by exchanging a random access preamble with eNB 220/gNB 310 over a Physical Random Access Channel (PRACH) (M505). Once synchronized with eNB 220/gNB 310, UEs-N 110 may send a request for an RRC connection to eNB 220/gNB 310 over uplink shared channel (UL-SCH) to establish RAN connectivity and services (M510).

In an embodiment, eNB 220/gNB 310 may not have sufficient radio resources to establish RRC connections for all UEs-N 110. Accordingly, eNB 220/gNB 310 may grant a smaller number (N1) of RRC connections by sending UEs-N1 110 connection setup messages via downlink shared channel (DL-SCH) (M515). In response, UEs-N1 110 will send RRC connection complete messages to eNB 220/gNB 310 via UL-SCH (M520). Once the radio channels are setup, a number of messages may be exchanged (e.g., SIP registration requests and responses) between UEs-N1 110 and CSCF 510 to complete SIP registrations with IMS 140 (M525). These N1 SIP registrations are jointly performed in messages M525.

In FIG. 5B, UE-M 110 and UE-N2 110 (where N2=N−N1) attempt to establish RRC connections, but fail because the radio resources of eNB 220/gNB 310 are exhausted (M530). Note that UE-N2 110 are the remaining UEs-N that did not establish RRC connections because radio resources of eNB 220/gNB 310 are exhausted. UEs-M 110 and UEs-N2 110 try several times to establish RRC connections with eNB 220/gNB 310 and fail (M535, M540). UEs-M 110 and UEs-N2 110 attempt to re-establish the RRC connection when a timer expires. The timer (e.g., a T300 timer) may be broadcast in a system information block 2 (SIB 2) sent from eNB 220/gNB 310.

While monitoring SIP method activity in B502, CSCF 510 determines that SIP method activity has exceeded a threshold in a predetermined period of time (e.g., exceeded SIP registration requests) (B504). CSCF 510 invokes congestion control in response, and sends SIP response messages to UEs-M 110 and UEs-N2 110 (M545). The SIP response messages include an overload control timer ($T_{OCT}$). The SIP response messages instruct UEs-M 110 and UEs-N2 110 to retry establishing connections after $T_{OCT}$. The overload control timer $T_{OCT}$ may be a randomized SIP retry timer over a predetermined time range (e.g., 0-60 seconds). $T_{OCT}$ can be different and randomly distributed (e.g., uniform, normal, etc.) for each of UEs-M 110 and UEs-N2 110. The random retry times spread out the time over which UEs-M 110 and UEs-N2 110 attempt to connect to eNB 220/gNB 310, thus reducing congestion experienced by the RRC channels and IMS 140.

Upon receiving SIP Response message including overload control timer $T_{OCT}$ in message M545, the UE SIP agent delays the SIP registration requests by eNB 220/gNB 310 to IMS 150. If $T_{OCT}$ is longer than the configured RRC inactivity timers, UEs-M 110 and UEs-N2 110 will transition from the RRC connected state to the RRC Idle state, thereby halting transmission of uplink RRC requests and reducing congestion on the RAN. Just prior to transitioning to the RRC idle state, UEs-M 110 and UE-N2 110 inform eNB 220/gNB 310 that the UEs-M 110 and UEs-N2 110 are about to transition to the RRC idle state based upon the random delays set by $T_{OCT}$ (M550).

UEs-M 110 and UEs-N2 110 may begin to request services and perform the RRC connection establishment procedure (M555). Since the RAN uplink is no longer congested, various types of UEs 110 (e.g., IoT and M2M devices) including consumer data and VoLTE devices are able to establish radio connections and resume services due to effective congestion control of the RAN associated with eNB 220/gNB 310. Finally, when SIP requests decrease to a threshold (e.g., over a predetermined time period) (M560), CSCF 510 exits the congestion control algorithm and resumes normal operations (B506).

Figure 6:
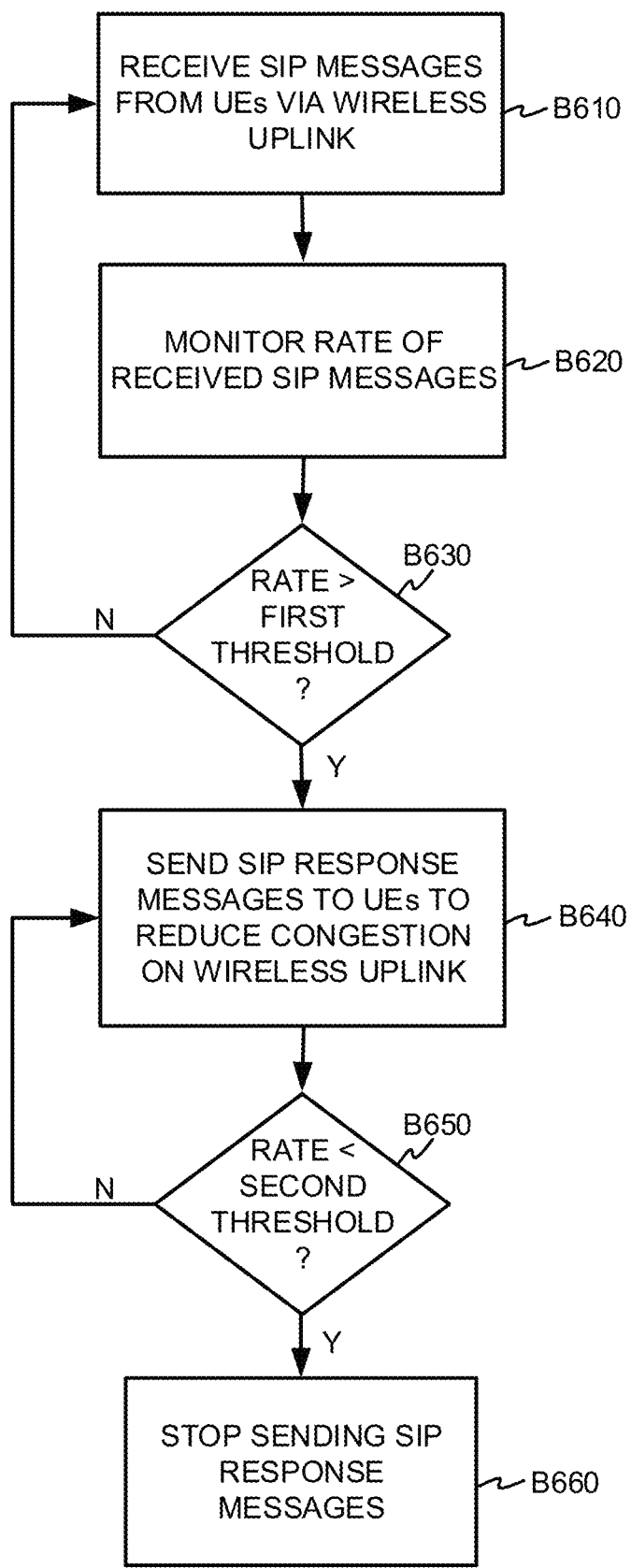
FIG. 6 is a flow chart showing an exemplary process for performing uplink congestion control based on SIP messaging.

FIG. 6 is a flow chart showing an exemplary process 600 for performing uplink congestion control based on SIP messaging. In an embodiment, process 600 may execute within a network device 400 on processor 420. In an embodiment, network device may be P-CSCF 295. However, in other embodiments, process 600 may execute on I/S-CSCF 290.

Initially, processor 420 may receive SIP messages from UEs 110 via established wireless uplink connections of the RAN associated with eNB 220/gNB 310 (B610). The SIP messages may include SIP registration requests. In alternative embodiments, the SIP messages may include other types of SIP messages which include, for example, SIP invite message, SIP subscribe message, SIP notify message, SIP publish message, SIP acknowledgement, SIP bye, etc.

Processor 420 may monitor a rate of the SIP messages received from the UEs 110 (Block 620). The rate may be monitored at eNB 220/gNB 310. Processor 420 may identify whether the rate of received SIP messages exceeds a first threshold during a first period of time (Block 630). In one implementation, the first threshold may be defined as an overload control activation rate (OCAR) for a given eNB 220/gNB 310. The OCAR may be specified in messages per millisecond for a given eNB 220/gNB 310 and/or CSCF 510. The first period of time defined as an overload control activation timer (OCAT) which may be configurable in milliseconds.

Processor 420 may send SIP response messages to the UEs 110 to reduce congestion on the wireless uplink connections upon determining that the rate of received SIP messages exceeded the first threshold over the first period of time (Block 640). The SIP response messages may instruct the UEs 110 to resend the SIP messages after predetermined time delays. The predetermined time delays may be generated randomly and vary between different UEs. In an embodiment, the generation of the time delays may be varied to change the distribution characteristic UEs 110 retrying connections to eNB 220/gNB 310. The predetermined time delays may be based on a retry time included in the SIP response messages defined as an overload control timer value, or may be based on the class of the UEs. The overload control timer value may be between 0 and 60 seconds, and may be randomly generated to shape a cumulative distribution of SIP messages resent by the UEs.

In an embodiment, when SIP response messages are sent to UEs 110 to reduce congestion, processor 420 may further identify whether the rate of received SIP messages decreases below a second threshold during a second period of time (Block 650). The second threshold be defined as an overload control deactivation rate (OCDR) for a given eNB 220/gNB 310. The OCDR may be specified in messages per millisecond for a given eNB 220/gNB 310 and/or CSCF 510. The second period of time may be defined as an overload control deactivation timer (OCDT) which may be configurable in milliseconds. In an embodiment, the SIP response message may include a Not Found (404) message, a Request Entity Too Large (413) message, a Temporarily Unavailable (480) message, a Busy Here (486) message, a Server Internal Error (500) message, a Service Unavailable (503) message, and/or a Server Timed Out (504) message.

Upon processor 420 identifying that the rate of received SIP messages decreased below the second threshold during a second period of time, processor 420 may cease the sending of SIP response messages (Block 660). Processor 420 then may resume normal operations for CSCF 510.

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIGS. 5A-5B and 6, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving session initiation protocol (SIP) messages from user equipment devices (UEs) via established wireless uplink connections;
   monitoring a rate of the SIP messages received from the UEs;
   identifying whether the rate of received SIP messages exceeds a first threshold during a first period of time;
   generating predetermined time delays to randomly vary between different UEs and to shape a cumulative distribution of SIP messages resent by the UEs; and
   sending SIP response messages to the UEs to reduce congestion on the wireless uplink connections upon identifying that the rate of received SIP messages exceeded the first threshold over the first period of time, wherein the sent SIP response messages instruct the UEs to resend the SIP messages after the predetermined time delays.

2. The method of claim 1, wherein upon sending SIP response messages to the UEs to reduce congestion on the wireless uplink connections, the method further comprises:
   identifying whether the rate of received SIP messages decreases below a second threshold during a second period of time; and
   ceasing the sending of SIP response messages to reduce congestion on the wireless uplink connections upon identifying that the rate of received SIP messages decreased below the second threshold during the second period of time.

3. The method of claim 1, wherein the receiving SIP messages from the UEs further comprises:
   receiving registration request messages, invite messages, subscribe request messages, notification messages, or publish messages.

4. The method of claim 1, wherein the predetermined time delays are based on a class of user.

5. The method of claim 1, wherein sending SIP response messages further comprise:
   sending at least one of a Not Found message, a Request Entity Too Large message, a Temporarily Unavailable message, a Busy Here message, a Server Internal Error message, a Service Unavailable message, or a Server Timed Out message.

6. The method of claim 1, wherein the SIP response messages include provisional response codes.

7. The method of claim 2, wherein the first threshold and second threshold include overload control activate rates associated with a base station.

8. A network device, comprising:
   a network interface;
   a memory configured to store instructions; and
   a processor coupled to the network interface and the memory, wherein the processor is configured to execute the instructions stored in the memory to:

receive session initiation protocol (SIP) messages from user equipment devices (UEs) via established wireless uplink connections, monitor a rate of the SIP messages received from the UEs, identify whether the rate of received SIP messages exceeds a first threshold during a first period of time, generate predetermined time delays to randomly vary between different UEs and to shape a cumulative distribution of SIP messages resent by the UEs, and send SIP response messages to the UEs to reduce congestion on the wireless uplink connections upon identifying that the rate of received SIP messages exceeded the first threshold over the first period of time, wherein the sent SIP response messages instruct the UEs to resend the SIP messages after the predetermined time delays.

9. The network device of claim 8, wherein upon the processor sending SIP response messages to the UEs to reduce congestion on the wireless uplink connections, the instructions further cause the processor to:

identify whether the rate of received SIP messages decreases below a second threshold during a second period of time, and cease the sending of SIP response messages to reduce congestion on the wireless uplink connections upon determining that the rate of received SIP messages decreased below the second threshold during the second period of time.

10. The network device of claim 8, wherein the instructions to receive SIP messages from the UEs further cause the processor to:

receive registration request messages, invite messages, subscribe request messages, notification messages, or publish messages.

11. The network device of claim 8, wherein the predetermined time delays are based on a class of user.

12. The network device of claim 8, wherein the instructions to send SIP response messages further cause the processor to:

send at least one of a Not Found message, a Request Entity Too Large message, a Temporarily Unavailable message, a Busy Here message, a Server Internal Error message, a Service Unavailable message, or a Server Timed Out message.

13. The network device of claim 8, wherein the SIP response messages include provisional response codes.

14. The network device of claim 9, wherein the first threshold and second threshold include overload control activate rates associated with a base station.

15. A non-transitory computer-readable medium comprising instructions, which, when executed by a processor, cause the processor to:

receive session initiation protocol (SIP) messages from user equipment devices (UEs) via established wireless uplink connections;

monitor a rate of the SIP messages received from the UEs;

identify whether the rate of received SIP messages exceeds a first threshold during a first period of time;

generate predetermined time delays to randomly vary between different UEs and to shape a cumulative distribution of SIP messages resent by the UEs; and send SIP response messages to the UEs to reduce congestion on the wireless uplink connections upon identifying that the rate of received SIP messages exceeded the first threshold over the first period of time, wherein the sent SIP response messages instruct the UEs to resend the SIP messages after the predetermined time delays.

16. The non-transitory computer-readable medium of claim 15, wherein upon sending SIP response messages to the UEs to reduce congestion on the wireless uplink connections, the instructions cause the processor to:

identify whether the rate of received SIP messages decreases below a second threshold during a second period of time; and cease the sending of SIP response messages to reduce congestion on the wireless uplink connections upon determining that the rate of received SIP messages decreased below the second threshold during the second period of time.

17. The non-transitory computer-readable medium of claim 15, wherein the instructions to receive SIP messages from the UEs further cause the processor to:

receive registration request messages, invite messages, subscribe request messages, notification messages, or publish messages.

18. The non-transitory computer-readable medium of claim 15, wherein the predetermined time delays are based on a class of user.

19. The non-transitory computer-readable medium of claim 15, wherein the SIP response messages include provisional response codes.

20. The non-transitory computer-readable medium of claim 16, wherein the first threshold and second threshold include overload control activate rates associated with a base station.

* * * * *